United States Patent
Purumala et al.

(10) Patent No.: US 10,817,546 B2
(45) Date of Patent: Oct. 27, 2020

(54) LABELLING OF AGGREGATED GEOLOCATION TAGS IN A DIGITAL MAPPING SYSTEM

(71) Applicant: Adobe Inc., San Jose, CA (US)

(72) Inventors: Ram Prasad Purumala, Noida (IN); Ankit Gulati, Gurgaon (IN); Dheeraj Kumar, Mandi Gobindgarh (IN); Manik Singhal, Ghzaiabad (IN)

(73) Assignee: Adobe Inc., San Jose, CA (US)

( * ) Notice: Subject to any disclaimer, the term of this patent is extended or adjusted under 35 U.S.C. 154(b) by 947 days.

(21) Appl. No.: 15/266,569

(22) Filed: Sep. 15, 2016

(65) Prior Publication Data
US 2018/0075061 A1     Mar. 15, 2018

(51) Int. Cl.
| | |
|---|---|
| G06F 16/29 | (2019.01) |
| G06F 16/28 | (2019.01) |
| G06F 16/58 | (2019.01) |
| G06F 16/9537 | (2019.01) |

(52) U.S. Cl.
CPC ............ *G06F 16/29* (2019.01); *G06F 16/287* (2019.01); *G06F 16/5866* (2019.01); *G06F 16/9537* (2019.01)

(58) Field of Classification Search
CPC .... G06F 16/287; G06F 16/29; G06F 16/5866; G06F 16/9537
USPC ....................................................... 707/736
See application file for complete search history.

(56) References Cited

U.S. PATENT DOCUMENTS

| | | | |
|---|---|---|---|
| 7,948,502 B2 | 5/2011 | Stanton | |
| 8,015,183 B2* | 9/2011 | Frank | G06F 16/38 |
| | | | 707/724 |
| 8,200,676 B2* | 6/2012 | Frank | G06F 16/9537 |
| | | | 707/749 |
| 8,584,015 B2 | 11/2013 | Osten | |
| 9,251,173 B2* | 2/2016 | DeSpain | G06K 9/46 |
| 9,412,035 B2* | 8/2016 | DeSpain | G06K 9/46 |
| 9,489,813 B1* | 11/2016 | Beigel | G08B 13/2417 |

(Continued)

OTHER PUBLICATIONS

Adobe® Elements Organizer Help, Version 13 (Sep. 22, 2014). Downloaded from <http://help.adobe.com/archive/en/elements-organizer/13/elements-organizer_reference.pdf>.

(Continued)

*Primary Examiner* — Syling Yen
(74) *Attorney, Agent, or Firm* — Finch & Maloney PLLC

(57) ABSTRACT

Geotag data embedded in a photograph is converted to a multilevel hierarchical place name tag, which is a new data structure. Higher hierarchy levels correspond to larger geographical regions. Lower hierarchy levels correspond to smaller geographical regions. The geotag data is used to locate the photograph on a map. A cluster of nearby photographs is defined and represented by a consolidated pin. The identification and quantity of clustered photographs depends on the relative locations of the photographs and the map zoom level. A consolidated pin label is defined based on which hierarchy levels, if any, have a common place name tags. In some cases the consolidated pin label includes only place name tags that are shared amongst all clustered photographs. In other cases the consolidated pin label includes a short list of mutually exclusive place name tags. The consolidated pin label is displayed on the map near the consolidated pin.

20 Claims, 10 Drawing Sheets

(56) References Cited

U.S. PATENT DOCUMENTS

| | | | | |
|---|---|---|---|---|
| 9,552,376 B2* | 1/2017 | Desmond | ............ | G06F 16/5866 |
| 2007/0011150 A1* | 1/2007 | Frank | .................. | G06F 16/9537 |
| 2008/0010273 A1* | 1/2008 | Frank | ...................... | G06F 16/38 |
| 2008/0010605 A1* | 1/2008 | Frank | ...................... | G06F 16/38 |
| | | | | 715/765 |
| 2008/0270366 A1* | 10/2008 | Frank | ................. | G06F 16/9537 |
| 2010/0046842 A1* | 2/2010 | Conwell | ............... | G06K 9/228 |
| | | | | 382/218 |
| 2012/0096361 A1* | 4/2012 | Osten | .................. | G11B 27/034 |
| | | | | 715/731 |
| 2013/0332068 A1* | 12/2013 | Kesar | .................... | H04W 4/185 |
| | | | | 701/430 |
| 2014/0082505 A1 | 3/2014 | Watson et al. | | |
| 2014/0181089 A1* | 6/2014 | Desmond | ............ | G06F 16/5866 |
| | | | | 707/722 |
| 2015/0278298 A1* | 10/2015 | Boldyrev | .............. | G06F 17/278 |
| | | | | 707/754 |
| 2016/0033295 A1 | 2/2016 | Li et al. | | |
| 2016/0140146 A1* | 5/2016 | Wexler | .................... | G06K 9/18 |
| | | | | 707/741 |

OTHER PUBLICATIONS

Adobe® Photoshop® Lightroom® 5 Help, Chapter 8 (Jun. 2014). Downloaded from <http://help.adobe.com/archive/en/lightroom/5/lightroom_reference.pdf>.
IPhoto: View Photos by Location (Jun. 22, 2015). Downloaded from <https://support.apple.com/kb/PH21274?locale=en_US>.
Viewing Pictures on a Map (Jul. 18, 2014). Downloaded from <https://support.apple.com/kb/PH21274?locale=en_US>.
Developer's Guide, Google Maps Geocoding API (Aug. 2, 2016). Downloaded from <https://developers.google.com/maps/documentation/geocoding/intro>.

* cited by examiner

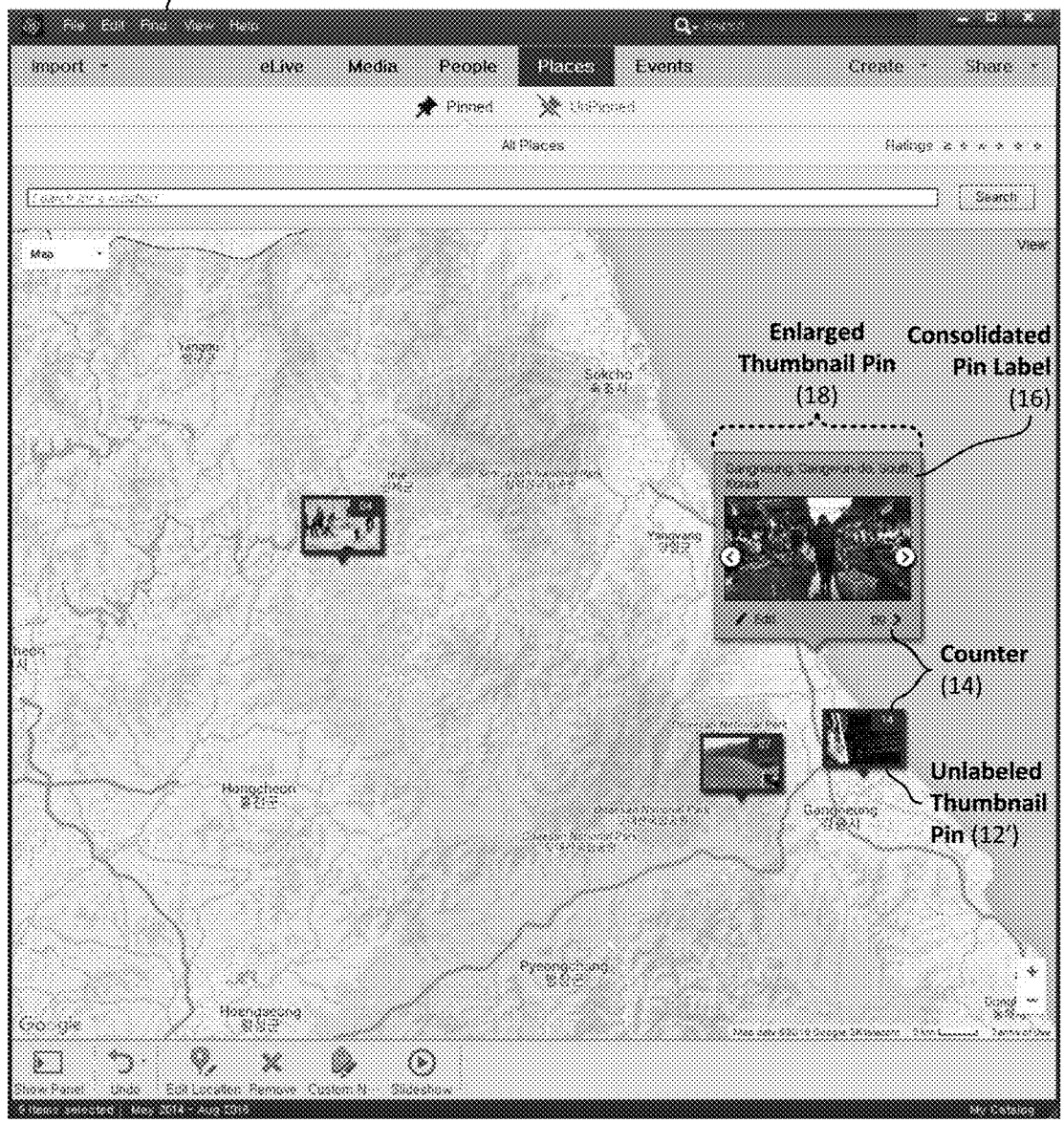

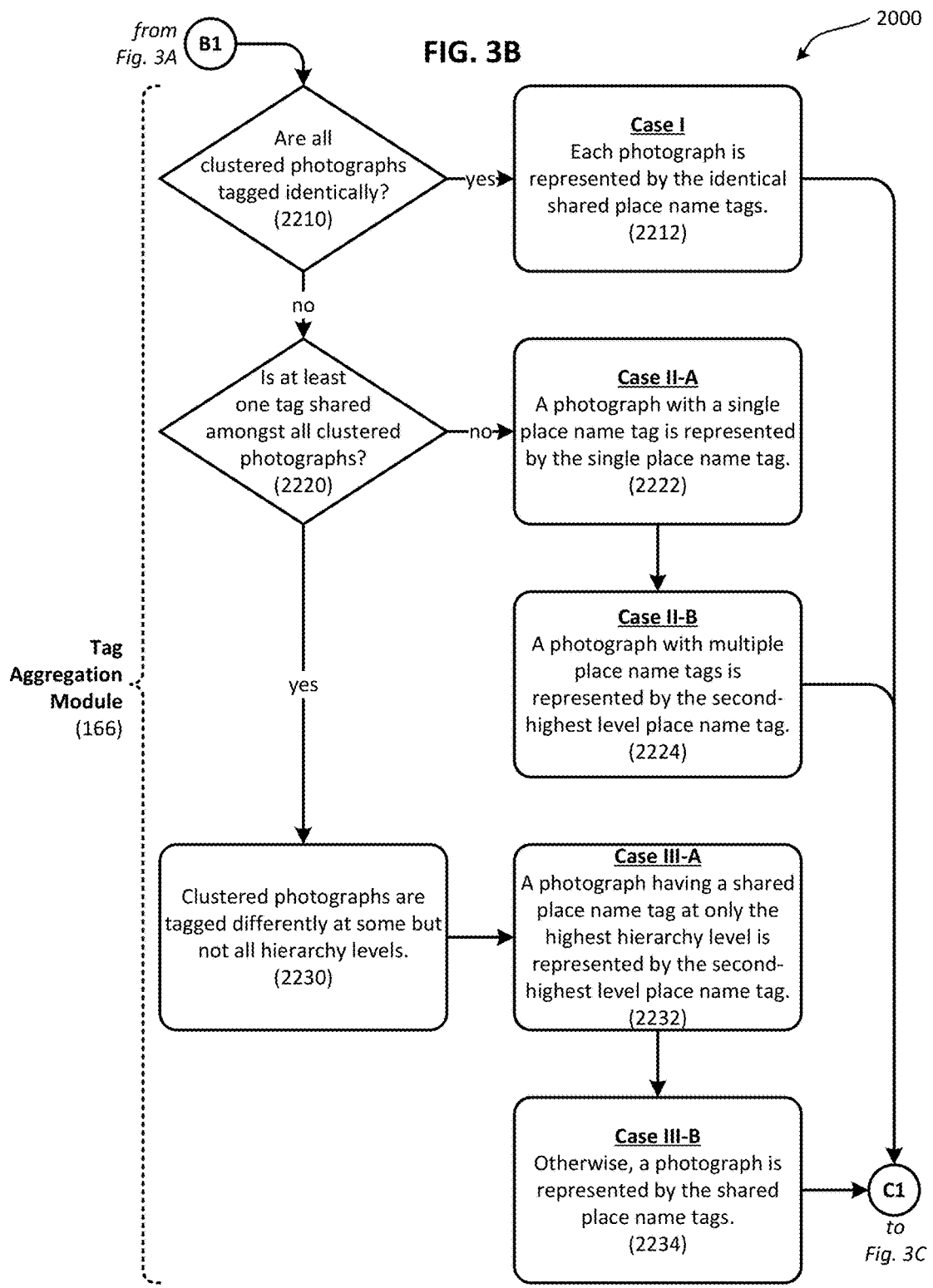

FIG. 4A

| Example | Photo Index | PN1 | PN2 | PN3 | PN4 | Case | Representative Tags | Consolidated Pin Label |
|---|---|---|---|---|---|---|---|---|
| A | 1 | USA | California | Los Angeles | Vin Scully Avenue | III-B | USA, California, Los Angeles | USA, California, Los Angeles |
| A | 2 | USA | California | Los Angeles | Olympic Boulevard | III-B | USA, California, Los Angeles | USA, California, Los Angeles |
| B | 1 | USA | California | Los Angeles | Vin Scully Avenue | III-B | USA, California | USA, California |
| B | 2 | USA | California | Santa Monica | Ocean Boulevard | III-B | USA, California | USA, California |
| C | 1 | USA | California | Los Angeles | Vin Scully Avenue | III-A | California | California, Arizona |
| C | 2 | USA | Arizona | Phoenix | Seventh Street | III-A | Arizona | California, Arizona |
| D | 1 | USA | California | Los Angeles | Vin Scully Avenue | II-B | California | California, Sonora |
| D | 2 | México | Sonora | Nogales | Padre Nacho | II-B | Sonora | California, Sonora |
| E | 1 | USA | California | Los Angeles |  | II-B | California | California, Sonora |
| E | 2 | México | Sonora | Nogales |  | II-B | Sonora | California, Sonora |
| F | 1 | USA | California | Los Angeles |  | III-B | USA, California | USA, California |
| F | 2 | USA | California | Santa Monica |  | III-B | USA, California | USA, California |
| G | 1 | USA | California | Los Angeles |  | III-A | California | California, Arizona |
| G | 2 | USA | Arizona | Phoenix |  | III-A | Arizona | California, Arizona |
| H | 1 | USA | California |  |  | III-A | California | California, Arizona |
| H | 2 | USA | Arizona |  |  | III-A | Arizona | California, Arizona |
| I | 1 | USA | California |  |  | II-B | California | California, Sonora |
| I | 2 | México | Sonora |  |  | II-B | Sonora | California, Sonora |
| J | 1 | USA | California |  |  | II-B | California | California, México |
| J | 2 | México |  |  |  | II-A | México | California, México |
| K | 1 | USA |  |  |  | II-A | USA | USA, México |
| K | 2 | México |  |  |  | II-A | México | USA, México |

FIG. 4B

| Example | Photo Index | PN1 | PN2 | PN3 | PN4 | Case | Representative Tags | Consolidated Pin Label |
|---|---|---|---|---|---|---|---|---|
| L | 1 | USA | California | Los Angeles | Vin Scully Avenue | II-B | California | USA, México, California, Arizona, Sonora |
| | 2 | USA | California | Los Angeles | Olympic Boulevard | | California | |
| | 3 | USA | California | Santa Monica | Ocean Boulevard | | California | |
| | 4 | USA | Arizona | Phoenix | Seventh Street | | Arizona | |
| | 5 | México | Sonora | Nogales | Padre Nacho | | Sonora | |
| | 6 | USA | California | Los Angeles | | | California | |
| | 7 | México | Sonora | Nogales | | | Sonora | |
| | 8 | USA | California | Santa Monica | | | California | |
| | 9 | USA | Arizona | Phoenix | | | Arizona | |
| | 10 | USA | California | | | | California | |
| | 11 | USA | Arizona | | | | Arizona | |
| | 12 | México | Sonora | | | | Sonora | |
| | 13 | México | | | | II-A | México | |
| | 14 | USA | | | | | USA | |

Index a plurality of photographs, each photograph having associated therewith geotag data that defines a geographic location.
(5100)

↓

Define a plurality of hierarchical place name tags for each photograph, wherein the plurality of hierarchical place name tags for each photograph includes a highest level place name tag and at least one lower level place name tag.
(5200)

↓

Identify a subset of the photographs having geographic locations that are nearby each other on the interactive digital map based on a specified zoom level of a displayed interactive digital map of a specified region.
(5400)

↓

Make a first determination that there is no common hierarchical place name tag amongst the photographs in the subset.
(5500)

↓

Define a consolidated pin label that includes a plurality of hierarchical place name tags for the consolidated pin label, wherein the plurality of hierarchical place name tags for the consolidated pin do not include any of the highest level place name tags.
(5600)

LABELLING OF AGGREGATED GEOLOCATION TAGS IN A DIGITAL MAPPING SYSTEM

FIELD OF THE INVENTION

This disclosure relates generally to a digital mapping system, and more specifically to techniques for labelling aggregated geolocation tags in a digital mapping system.

BACKGROUND

Digital mapping systems allow users to view and interact with maps using a wide range of computing devices, including desktop computers, tablet computers, and smartphones. In addition to basic panning and zooming functionality, the most popular digital mapping systems tend to be customizable and extensible, thus enabling them to provide a user experience that is specifically tailored to the needs of a given application. In general, this customizability and extensibility is provided by an application programming interface (API) that enables external websites and applications to access baseline mapping data and functionality in an automated fashion. The API allows software developers to overlay customized information onto an interactive map, thus providing a specifically tailored user experience for a particular application or website. For example, mobile and web applications have been developed that are capable of displaying a retailer's store locations on a map, calculating the time at which the next bus is expected to arrive at a particular bus stop, and providing navigation instructions to reach a particular location. Examples of digital mapping systems include Google Maps™ (Google Inc., Mountain View, Calif.), Bing® Maps (Microsoft Corp., Redmond, Wash.), and Apple® Maps (Apple Inc., Cupertino, Calif.).

One especially popular extension of digital mapping systems has come with the integration of photograph organizer applications, thus allowing users to create customized maps that pinpoint the locations where photographs have been snapped. This extension has been facilitated by the growing ubiquity of smartphones and other digital cameras that capture geolocation data each time a photograph is snapped. The result is a photograph having location information embedded in metadata. Given these baseline technologies it is becoming increasingly common for users to have collected a sizable library of geotagged photographs. This allows users to organize and arrange their photographs geographically, for example by virtually pinning them to a digital map. Examples of existing photograph organizer applications that provide such functionality include Photoshop® Lightroom® (Adobe Systems Incorporated, San Jose, Calif.), Photoshop® Elements (Adobe Systems Incorporated, San Jose, Calif.), Picasa™ (Google Inc., Mountain View, Calif.), and iPhoto® (Apple Inc., Cupertino, Calif.).

While a geographical organization framework provides a number of advantages as compared to more conventional filename, keyword, or timestamp organization frameworks, pinning a large quantity of photographs to a digital map can be confusing, cluttered, and awkward, particularly if the photographs are concentrated in a small geographic area. For example, simply pinning photographs to a map does not necessarily help a user locate or organize the photographs using easily recognizable geographic place names, such as the names of cities and streets. And while existing systems can reduce clutter by aggregating multiple closely-spaced pins into a single consolidated pin, this still does not provide the user with any meaningful insight into the particular locations of the aggregated photographs. For instance, a user may be interested only in photographs taken in Culver City, but a consolidated pin located in Culver City might also represent photographs taken in nearly Los Angeles or Santa Monica. This ambiguity is further compounded when the photograph aggregation dynamically changes as the map is zoomed in or out. The user thus has difficulty in identifying which consolidated pins represent photographs of interest. These challenges are representative of the shortcomings associated with existing photograph organizer applications.

BRIEF DESCRIPTION OF THE DRAWINGS

FIG. 1B is a screenshot of an example of a photograph originator user interface displaying a map that includes a plurality of thumbnail pins, each of which has a consolidated pin label, wherein the map is in a relatively zoomed-out state.

FIG. 1C is a screenshot of an example of a photograph organizer user interface displaying a map that includes an enlarged thumbnail pin having a consolidated pin label.

FIGS. 3A through 3C comprise a flowchart illustrating an example method for labelling aggregated geolocation tags in a digital mapping system.

FIGS. 4A and 4B comprise a table that lists several examples of how hierarchical place name tags for multiple photographs can be combined into a single consolidated pin label.

FIG. 5 is a flowchart illustrating an example technique for labelling aggregated geolocation tags on a digital map.

DETAILED DESCRIPTION

Figure 1A:
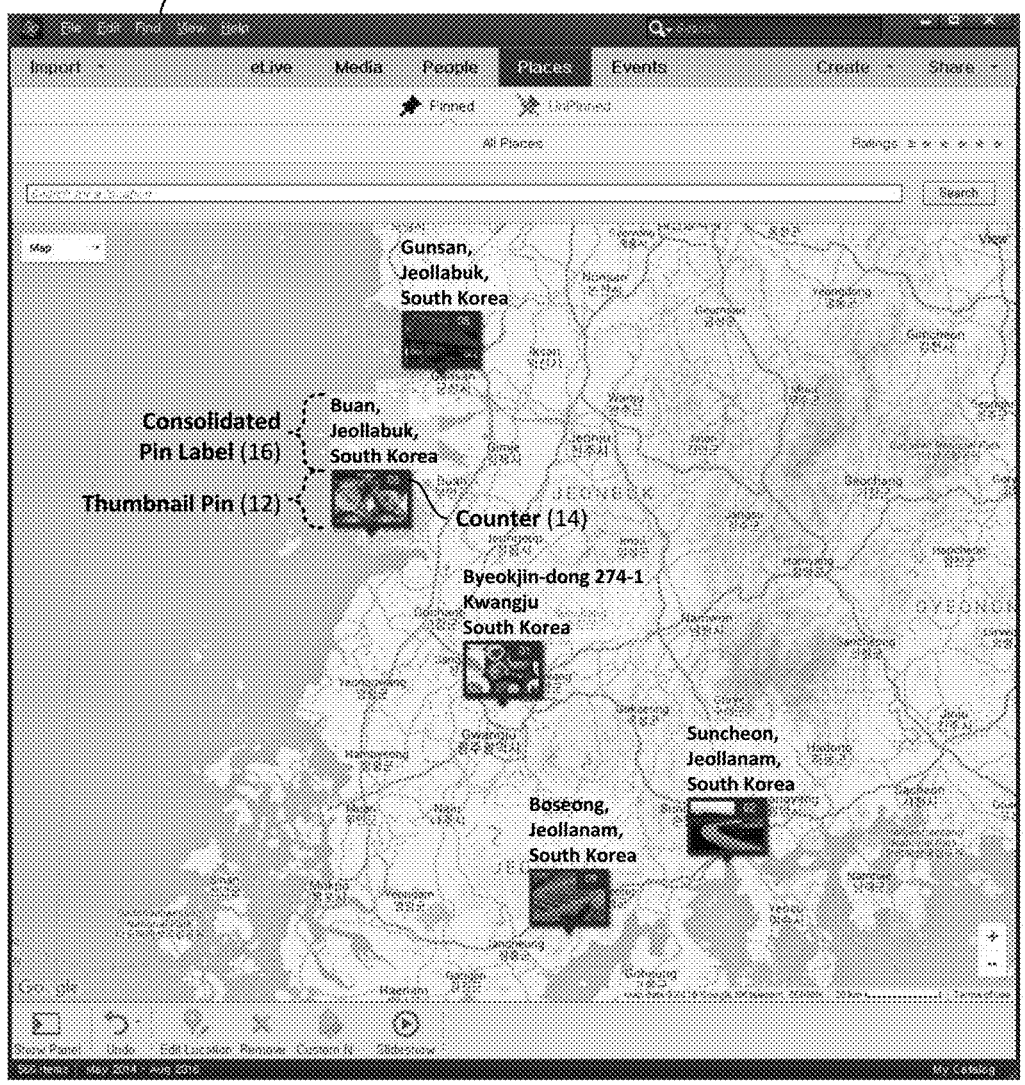
FIG. 1A is a screenshot of an example of a photograph organizer user interface displaying a map that includes a plurality of thumbnail pins, each of which has a consolidated pin label, wherein the map is in a relatively zoomed-in state.

As noted above, existing photograph organization applications do not aggregate meaningful location information into a compact yet descriptive label that is applied to a consolidated pin representing multiple photographs on a digital map. In recognition of this, disclosed herein are improved techniques for labelling aggregated geolocation tags in a digital mapping system. In one example implementation geotag data embedded in a digital photograph (for example: 34° 03' N, 118° 15' W) is converted to a multilevel hierarchical place name tag (for example: USA, California, Los Angeles, Fourth Street), which is a new data structure. Higher hierarchy levels correspond to larger geographical regions (such as a country or a region) and lower hierarchy levels correspond to smaller geographical regions (such as a city or a street). The geotag data is also used to locate the photograph on a map. After geotag data for multiple photographs is processed, a cluster of nearby photographs can be defined and represented by a single consolidated pin. The identification and quantity of clustered photographs will depend on the relative locations of the photographs as well as the degree to which the map has been zoomed. A label for the consolidated pin is defined based on which hierarchy levels, if any, have a common place name tag amongst the clustered photographs. In some cases the consolidated pin label includes only place name tags that are shared amongst all the clustered photographs (for example: "USA, California"). In other cases the consolidated pin label includes a short list of mutually exclusive place name tags (for example, "California, Arizona"). The consolidated pin label is displayed on the map adjacent to the consolidated pin, optionally in response to user input, such as a pointer hover input. Numerous alternative configurations and modifications of this workflow will be apparent in light of this disclosure.

Certain of the embodiments disclosed herein address shortcomings associated with existing photograph organization applications. For example, when a user virtually pins a photograph to a digital map, providing a pin label with a geographic place name provides additional insight into where the photograph was taken. Even if the pin precisely identifies the location in a literal sense, using easily recognizable and hierarchical place names helps a user to filter images visually, such as by enabling the user to quickly and intuitively identify all photographs taken within a certain city, state, or other region. Moreover, when the user zooms out and nearby pins are consolidated to reduce clutter, the hierarchical place name framework facilitates creation of a consolidated pin label that accurately and concisely describes where the clustered photographs were snapped. The consolidated labels are thus responsive to changing map zoom levels. This helps the user to appreciate the geographical distribution of collected photographs, and to visually filter photographs snapped at a merged common location, such as all the photographs snapped in California or Florida. The hierarchical place name structure also allows limits to be set on the number of different place names listed in a consolidated label before a higher hierarchy level is used to identify clustered photographs. These and other advantages will be apparent in light of the disclosure provided herein.

The example screenshots provided in FIGS. 1A and 1B illustrate how a consolidated pin label is defined using hierarchical place name tags, and how the consolidated pin label adapts to different map zoom levels. In this example, a traveler has visited South Korea for holiday and has used her geolocation-enabled smartphone to snap photographs in several different provinces and cities. Each photograph includes embedded latitude and longitude geotag data. When the photographs are processed by a photograph organizer application, each latitude/longitude pair is converted into to a multilevel hierarchical place name tag. FIG. 1A illustrates a photograph organizer user interface 10 wherein clusters of closely-located photographs have been aggregated. Each cluster is represented by a thumbnail pin 12, a counter 14 indicating the number of aggregated photographs, and a consolidated pin label 16. In this implementation, consolidated pin label 16 comprises hierarchical place name tags that are shared amongst all of the aggregated photographs. Specifically, FIG. 1A illustrates:

a. one thumbnail pin that represents five photographs taken at different locations in Gunsan city, Jeollabuk province, South Korea (these are overlapping regions);

b. one thumbnail pin that represents six photographs taken at different locations in Buan county, Jeollabuk province, South Korea (these are overlapping regions);

c. one thumbnail pin that represents a single photograph taken at the address Byeokjin-dong 274-1, in Kwangju city, South Korea (these are overlapping hierarchical place name tags representing the location of the one thumbnail pin);

d. one thumbnail pin that represents nine photographs taken at different locations in Boseong county, Jeollanam province, South Korea (these are overlapping regions); and e. one thumbnail pin that represents two photographs taken at different locations in Suncheon city, Jeollanam province, South Korea (these are overlapping regions).

In this implementation, clutter is reduced by only displaying hierarchical place name tags that are shared amongst all of the aggregated photographs that are represented by a single consolidated pin label. These shared tags provide valuable information if the user wishes to explore the photographs by manipulating the displayed map (for example, with zooming and panning operations). Each consolidated pin label comprises a hierarchical sequence of geographically overlapping tags (for example, city, province, country). Even though many of the photographs in a given cluster may be associated with unique street-level place name tags, such tags are generally not used when labeling a consolidated pin.

FIG. 1B illustrates photograph organizer user interface 10 after the map has been zoomed out. The zoom out operation has caused several of the thumbnail pins to be further aggregated, in some cases with photographs that had not been mapped in FIG. 1A. The consolidated pin labels are modified accordingly. Specifically, FIG. 1B illustrates:

a. one thumbnail pin that represents 533 photographs taken at different locations in Gyeonggi province, Incheon city, and Seoul city (these are mutually exclusive regions);

b. one thumbnail pin that represents 21 photographs taken at different locations in Jeollabuk province, Jeollanam province, and Kwangju city (these are mutually exclusive regions); and c. one thumbnail pin that represents 12 photographs taken at different locations in Jeollanam province, Gyeongsangbuk province, and Busan city (these are mutually exclusive regions).

In this case, clutter is reduced by only displaying place name tags from a relatively higher hierarchy level (for example, metropolitan city or province) and omitting tags from relatively lower hierarchy levels (for example, municipal city, county, or street). Because the consolidated pin labels comprise a list of mutually exclusive regions, a highest level place name tag that is shared amongst all of the aggregated photos (for example, country) is omitted. This provides the user with an easy way to visually access photographs snapped at a merged location, such as all photographs snapped in Jeollanam province or all photographs snapped in Gyeonggi province. The user interfaces disclosed herein are optionally implemented in conjunction with searching and filtering tools that only display photographs containing certain geographical place name tags.

The consolidated pin labels illustrated in FIGS. 1A and 1B are therefore responsive to the map zoom level. In particular, regardless of how the map is zoomed, the labels provide the user with concise yet meaningful insight into the geographical regions where the clustered photographs were snapped. Adapting the consolidated pin labels based on the map zoom level avoids listing every place name tag associated with the clustered photographs, thereby reducing clutter. In some implementations, such as illustrated in FIGS. 1A and 1B, consolidated pin labels 16 are displayed adjacent to the corresponding thumbnail pins 12 as a default, without any user input. In other implementations, such as illustrated in FIG. 1C, clutter is further reduced by displaying unlabeled thumbnail pins 12'. In such case an enlarged thumbnail pin 18 is displayed in response to user input, such as hovering a pointer over one of unlabeled thumbnail pins 12'. Enlarged thumbnail pin 18 includes counter 14 and consolidated pin label 16.

As used herein, the term "hierarchical place name tag" refers broadly, in addition to its ordinary meaning, to a geographical place name that is associated with a level in a geographical hierarchy. An example geographical hierarchy comprises the levels {country; state; county; city; street}; corresponding example hierarchical place name tags are {USA, Oregon, Benton, Corvallis, 8th Street}. The levels in a geographical hierarchy can generally be understood as encompassing each other, such as a street that falls within a city, a city that falls within a county, a county that falls within a state, and a state that falls within a country. Even where exceptions to this general rule exist, such as where a street crosses into two different cities, or where a province falls into two different countries, the lower hierarchy level can be understood as comprising two separate geographical entities (for example, Wilshire Boulevard in the City of Los Angeles and Wilshire Boulevard in the City of Santa Monica). Hierarchy levels that represent larger geographical regions (for example, countries and states) are referred to as being relatively higher hierarchy levels. Likewise, hierarchy levels that represent smaller geographical regions (for example, cities and streets) are referred to as being relatively lower hierarchy levels. A given geographical location can be understood as falling within one or more levels of a geographical hierarchy, wherein each of these levels is referred to by a hierarchical place name tag. For example the geographical location 34° 03' N, 118° 15' W falls within the levels {country, state, city, street} of a geographical hierarchy, these levels being respectively associated with the hierarchical place name tags {USA, California, Los Angeles, Fourth Street}.

As used herein, the term "digital content" refers broadly, in addition to its ordinary meaning, to information intended for consumption by a user, such as when the content is displayed using a display device, played using a playback device, or otherwise rendered. Examples of digital content include photographs, social networking postings, documents, sound recordings, audiovisual recordings, and other multimedia content. The term digital content also includes information that is not specifically intended it be rendered, and therefore also encompasses embedded metadata that defines a geographical location. Digital content is encoded in binary digits (for example, zeroes and ones) that are stored in an electronic container often referred to as a "file" or "document". A single file may include multiple distinct digital content items. A file or document can take the form of a physical object, such as a non-transitory computer readable medium on which the digital content is recorded. In the context of applications involving digital computers, the terms "content" and "digital content" are often used interchangeably.

As used herein, the term "data structure" refers broadly, in addition to its ordinary meaning, to a way of storing and organizing data in a computer accessible memory so the data can be used by an application or software module. In its simplest form, a data structure can be, for example, a set of one or more memory locations. In some cases, a data structure may be implemented as a record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree or hierarchical format having a number of nodes; an object format that includes data fields, for instance similar to a record; or a combination of the foregoing. A data structure may include executable code for accessing and modifying the underlying structure and format of the data stored therein. In a more general sense, the data structure may be implemented as a data set that can store specific values without being constrained to any particular order or format. In one embodiment, a data structure represents a collection of photographs, each of which is associated with a latitude/longitude pair and one or more hierarchical place name tags. In another embodiment, a data structure correlates a virtual pin identifier with one or more geotagged content items. Numerous other data structure formats and applications will be apparent in light of this disclosure.

System Architecture

Figure 2:
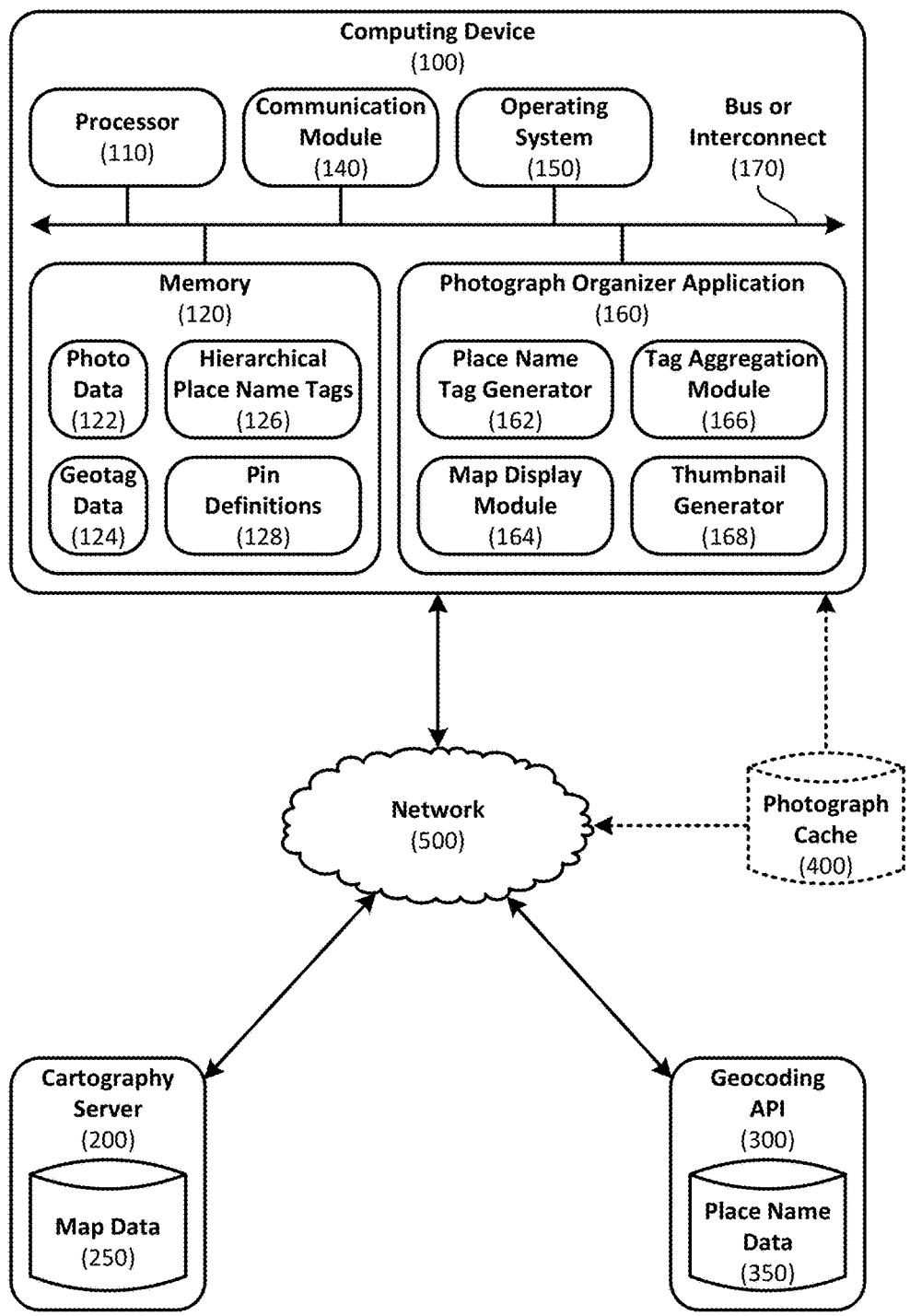
FIG. 2 is a block diagram illustrating selected components of an example photograph mapping framework that allows aggregated geolocation tags to be labelled intuitively and concisely.

FIG. 2 is a block diagram illustrating selected components of an example photograph mapping framework 1000 that allows aggregated geolocation tags to be labelled in an intuitive and concise manner. In framework 1000, a photograph organizer application 160 executing on a computing device 100 is capable of accessing services and resources provided by a cartography server 200, a geocoding API 300, and optionally, an external photograph cache 400. By leveraging such resources, photograph organizer application 160 can virtually pin digital photographs onto a digital map and accurately label the mapped content items with concise and meaningful geographical place names. As noted above, this helps users to quickly, intuitively, and visually appreciate the geographical distribution of collected photographs, and filter photographs snapped at a merged common location. However, while several of the embodiments disclosed herein are described in the context of virtually pinning and labelling digital photographs on a digital map, other digital content items (such as social network postings and other multimedia content) can likewise be pinned and labeled in other embodiments. Furthermore, other embodiments may include fewer or more devices and resources depending on the granularity of a particular implementation. For example, in an alternative implementation cartography server 200 includes an embedded geocoding API, thus eliminating any need for geocoding API 300. The various embodiments disclosed herein thus are not limited to provision or exclusion of any particular devices or resources.

Computing device 100, cartography server 200, and geocoding API 300 communicate with each other via a network 500. In some implementations network 500 can also be used to access optional supplementary resources, such as external photograph cache 400 from which digital photographs can be retrieved. Network 500 may be a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 500 is provided by a cellular data network, thereby making it easier for users of smartphones and tablet computers to leverage networked resources. In general, communications amongst the various entities and resources described herein may occur via wired or wireless connections, thereby facilitating the provision of mapping services to portable computing devices. For example, in an alternative implementation a location-enabled digital camera that includes a photograph cache 400 is directly connected to computing device 100. Such a connection can be provided by a wired connection, a Bluetooth connection, a Wi-Fi connection, or any other suitable communication technique. This allows computing device 100 to directly access a repository of digital content, thus bypassing network 500.

In certain embodiments computing device 100 comprises one or more devices selected from a desktop computer, a laptop computer, a workstation, a tablet computer, a smartphone, a handheld computer, a set-top box, an enterprise class device, or any other computing device suitable for displaying digital maps and interfacing with cartography server 200 or geocoding API 300. In general, computing device 100 will be understood as including software configured to implement the various functionalities disclosed herein, as well as hardware that enables such implementation. Examples of enabling hardware include a processor 110, a memory 120, a communication module 140, and a bus or interconnect 170. Examples of implementing software include an operating system 150 and photograph organizer application 160. In one particular implementation, photograph organizer application 160 further comprises a place name tag generator 162, a map display module 164, a tag aggregation module 166, and a thumbnail generator 168. Computer system 100 may include additional, alternative, or fewer hardware and software components in other embodiments, and thus the present disclosure should not be understood as being limited to the particular architecture illustrated in FIG. 2.

Processor 110 can be any suitable processor, and may include one or more coprocessors or controllers, such as an audio processor or a graphics processing unit, to assist in control and processing operations associated with computer system 100. Communication module 140 can be any appropriate network chip or chipset which allows for wired or wireless connection to other components of computer system 100, to peripheral components such as a smartphone having a photograph cache 400, and to network 500, thereby enabling computer system 100 to communicate with other local and remote computer systems, services, and resources, examples of which include cartography server 200 and geocoding API 300. Operating system 150 may comprise any suitable operating system, such as Android™ (Google Inc., Mountain View, Calif.), Windows® (Microsoft Corp., Redmond, Wash.), or OS X® (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently developed platform. Bus or interconnect 170 allows for inter- and intra-device communications using communication module 140.

Figure 3A:
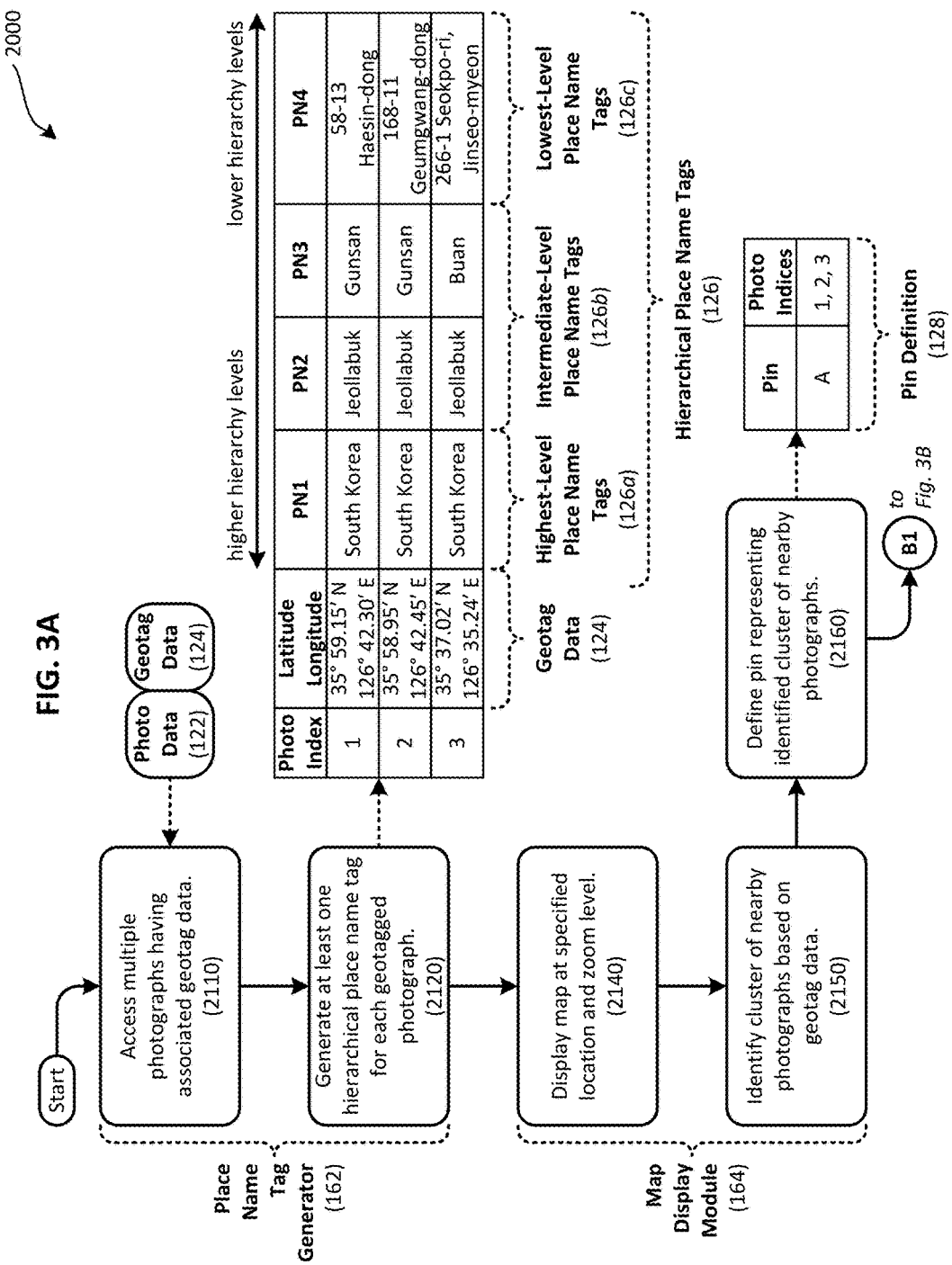

Memory 120 can be implemented using any suitable type of digital storage, such as one or more of a disc drive, a flash memory device, or a random access memory device. In certain embodiments, memory 120 is used to store digital content items, such as a collection of digital photographs. Thus, as illustrated in FIG. 2, memory 120 can be understood as including both photograph data 122 that defines a photographic image, as well as geotag data 124 that defines a location where the photographic image was snapped. Such data can be captured using, for example, a smartphone having a digital camera and a global positioning system receiver. Memory 120 can also be used to store certain of the data structures which are disclosed herein. For example, in one embodiment memory 120 stores a data structure that correlates latitude/longitude pairs with corresponding hierarchical place name tags 126. One example of such a data structure is illustrated in FIG. 3A, which will be described in turn. Memory 120 can additionally or alternatively be used to store a data structure that establishes one or more pin definitions 128 that correlate a thumbnail pin with one or more photographs and a consolidated pin label. One example of such a data structure is illustrated in FIG. 3B, which will also be described in turn.

As described herein, in certain embodiments photograph organizer application 160 is capable of virtually pinning digital photographs onto a digital map and accurately labelling the mapped content items with geographical place names that are both concise and meaningful. Such functionality can be implemented in conjunction with a wide range of existing or subsequently developed photograph organizer applications, one example of which is Photoshop® Elements (Adobe Systems Incorporated, San Jose, Calif.). To provide this functionality, photograph organizer application 160 optionally leverages externally-provided resources. One example of such an external resource is provided by cartography server 200, which includes a database containing map data 250. Map display module 164 can leverage the services provided by cartography server 200 to generate an interactive map, thus eliminating any need for computing device 100 to host map data and generate interactive maps. For example, Google Maps™ (Google Inc., Mountain View, Calif.), Bing® Maps (Microsoft Corp., Redmond, Wash.), and Apple® Maps (Apple Inc., Cupertino, Calif.) all provide cartography servers which can be used in this regard.

Another example of an external resource that photograph organizer application 160 can leverage is geocoding API 300, which includes a database containing place name data 350 that is mapped to geographical regions. In certain embodiments place name tag generator 162 extracts a latitude/longitude pair from a digital photograph and uses geocoding API 300 to generate a corresponding geographical place name. This place name can, in turn, be mapped to a geographical hierarchy, thus resulting in a hierarchical place name tag. This process is sometimes referred to as "reverse geocoding". For example, the Google Maps™ Geocoding API (Google Inc., Mountain View, Calif.), the Here Mobile SDK (Here Global B. V., Eindhoven, Netherlands), and the Bing® Maps Platform (Microsoft Corp., Redmond, Wash.) all provide geocoding APIs which can be used in this regard.

Still referring to the example embodiment illustrated in FIG. 2, photograph organizer application 160 further includes tag aggregation module 166, which comprises instructions encoded on a computer readable medium that, when executed using processor 110, cause a plurality of hierarchical place name tags to be aggregated. The result is a consolidated pin label that accurately and concisely represents all of the aggregated hierarchical place name tags. In certain implementations, the resulting consolidated pin label depends on which hierarchy levels, if any, have a common place name tag. In some cases the consolidated pin label includes only place name tags that encompass each other and that are shared amongst all the clustered photographs (for example: "Chile, Araucania Region"). In other cases the consolidated pin label includes a short list of mutually exclusive place name tags (for example: "Malleco, Cautin"). The resulting consolidated pin label can be displayed adjacent to a thumbnail image that is representative of the plurality of hierarchical place name tags which were aggregated. In certain embodiments the thumbnail image is generated from a digital photograph by thumbnail generator 168.

The embodiments described herein can be implemented in various forms of hardware, software, firmware, or special purpose processors. For example, in one embodiment a non-transitory computer readable medium has instructions encoded thereon that, when executed by one or more processors, cause aspects of photograph mapping framework 1000 to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, including photograph organizer applications, digital image editing applications, digital mapping systems, digital publishing applications, and content management systems. The computer software applications disclosed herein may include a number of different modules, sub-modules, or other components of distinct functionality, and can provide information to, or receive information from, still other components and services. These modules can be used, for example, to communicate with input/output devices such as a display screen, a touch sensitive surface, a printer, or any other suitable input/output device. Other components and functionality not reflected in the illustrations will be apparent in light of this disclosure, and it will be appreciated that the present disclosure is not intended to be limited to any particular hardware or software configuration. Thus in other embodiments the components illustrated in FIG. 2 may include additional, fewer, or other subcomponents.

The aforementioned non-transitory computer readable medium may be any suitable medium for storing digital information, such as a hard drive, a server, a flash memory, random access memory, or any suitable combination of the foregoing. In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software and firmware can be used in this regard, and that the present disclosure is not intended to be limited to any particular system architecture.

Methodology

Figure 3C:
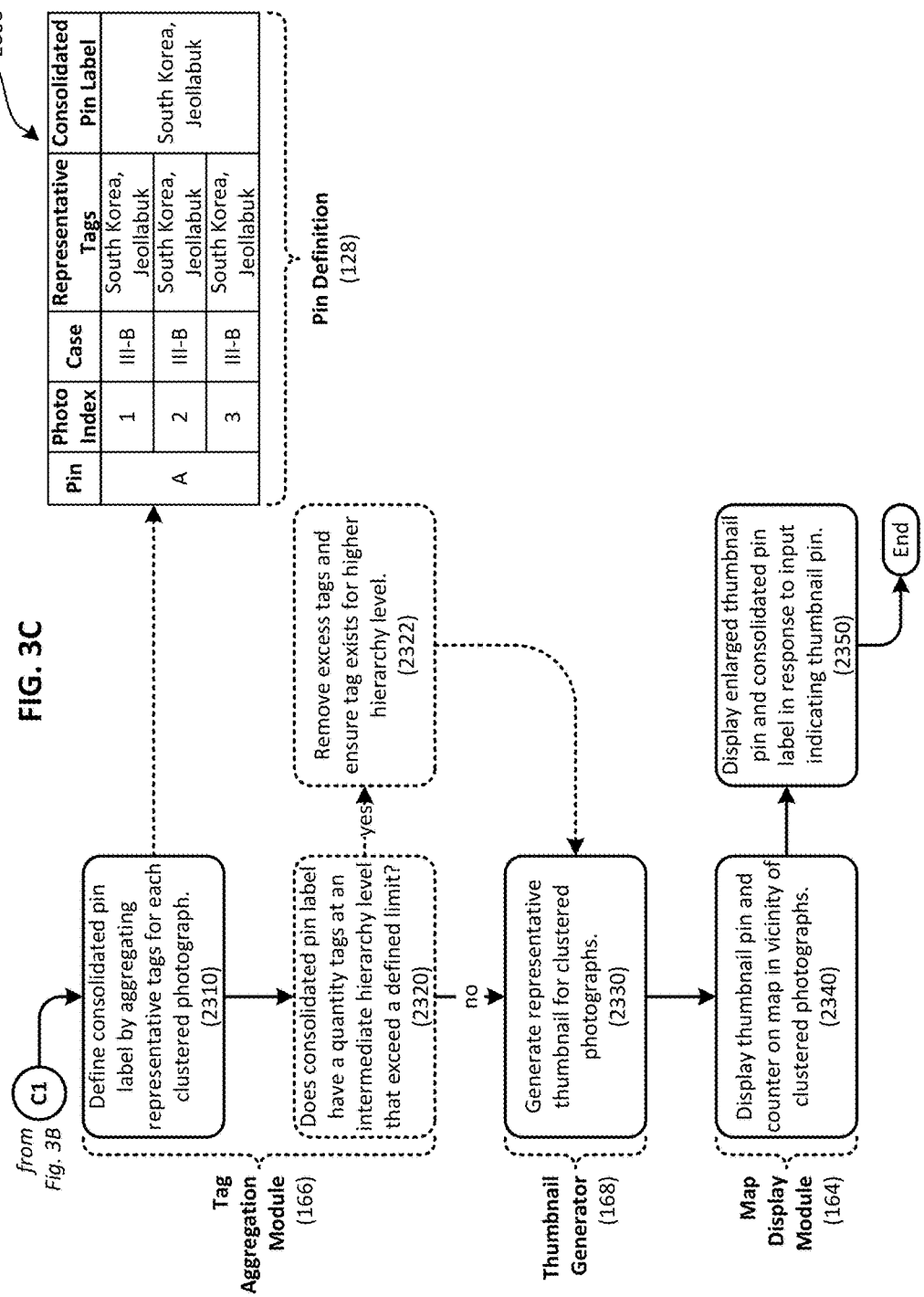

FIGS. 3A through 3C comprise a flowchart illustrating an example method 2000 for labelling aggregated geolocation tags in a digital mapping system. As can be seen, method 2000 includes a number of phases and sub-processes, the sequence of which may vary from one embodiment to another. However, when considered in the aggregate, these phases and sub-processes form part of a digital mapping framework that allows geolocation tags to be aggregated and labelled in a concise yet meaningful way. Method 2000, which in certain embodiments is responsive to user input as described herein, can be implemented using photograph mapping framework 1000 illustrated in FIG. 2. However other system architectures can be used in other embodiments, as will be apparent in light of this disclosure. To this end, the correlation of the various functionalities illustrated in FIGS. 3A through 3C to the components illustrated in FIG. 2 is not intended to imply any structural or use limitations. Rather, other embodiments may include, for example, varying degrees of integration wherein multiple functionalities are effectively performed by one resource or component. For example, in an alternative embodiment map display module 164 is capable of generating a place name tag based on a given latitude/longitude pair, thereby allowing place name tag generator 162 to be omitted. Thus, other embodiments may have fewer or more components depending on the granularity of implementation. Numerous variations and alternative configurations will therefore be apparent in light of this disclosure.

Method 2000 commences with place name tag generator 162 accessing multiple photographs having associated geotag data 124. See reference numeral 2110 in FIG. 3A. More specifically, the accessed photographs comprise both photograph data 122 that defines a visual image, as well as geotag data 124, such as a latitude/longitude pair, that identifies a geographic location, such as the location where the photograph was snapped. In some cases the associated geotag data is provided not in the form of an automatically generated latitude/longitude pair, but rather in terms of an address or other geographic locator (such as a latitude/longitude pair) that is manually entered by a user. In other cases, the user can perform a drag-and-drop operation to place a photograph at a particular location on a display map, with the particular location defining a corresponding geographical location to be associated with that photograph. In general, photographs may be accessed from a variety of different sources, including from local memory 120 or from a peripheral component such as a smartphone having external photograph cache 400. In one implementation, photographs are accessed from a library or other storage resource that is managed, monitored, or otherwise administered by photograph organizer application 160. In certain embodiments accessing the photographs includes indexing the photographs in a data structure that correlates each accessed photograph with one or more hierarchical place name tags, as will be described in turn.

Place name tag generator 162 leverages services provided by geocoding API 300 to generate at least one hierarchical place name tag 126 for each geotagged photograph. See reference numeral 2120 in FIG. 3A. The generated hierarchical place name tag 126 is a geographical place name that is associated with a level in a geographical hierarchy, and that is defined by geotag data 124. For example, as illustrated in FIG. 3A, the latitude/longitude pair 35° 59.15' N, 126° 42.30' E can be represented by the set of hierarchical place name tags {South Korea, Jeollabuk, Gunsan, 58-13 Haesin-dong}. These place name tags are "hierarchical" in the sense that they each refer to a level in a geographical hierarchy. For instance, continuing with the aforementioned example, "South Korea" refers to country, and is therefore a highest level place name tag 126*a* in the hierarchy. Likewise, "Jeollabuk" and "Gunsan" refer to a province and a municipal city, respectively, and are therefore intermediate-level place name tags 126*b* in the hierarchy. And "58-13 Haesin-dong" refers to a street location, and is therefore a lowest-level place name tag 126*c* in the hierarchy. Hierarchy levels that represent larger geographical regions (for example, countries and states) are referred to as being relatively higher hierarchy levels. Likewise, hierarchy levels that represent smaller geographical regions (for example, cities and streets) are referred to as being relatively lower hierarchy levels. While each of the example locations illustrated in FIG. 3A are represented by four hierarchical place name tags, some locations may be represented by fewer or more place name tags. For example, a photograph snapped on a transatlantic voyage might simply be represented by the single hierarchical place name tag "Atlantic Ocean".

Map display module 164 leverages services provided by cartography server 200 to display a map at a specified location and zoom level. See reference numeral 2140 in FIG. 3A. In such embodiments map display module 164 is capable of generating an interactive map that is responsive to zoom and pan commands. Once a specified location and zoom level are established, map display module 164 identifies a cluster of nearby photographs based on geotag data 124. See reference numeral 2150 in FIG. 3A. In this context, photographs may be considered "nearby" each other when they are separated by a distance, for example measured in pixels, that is less than a minimum separation threshold. In one embodiment the minimum separation threshold is determined based on the size of a pin used to represent photograph locations on the displayed map. In particular, the pin size affects the extent to which individual pins can be distinctively displayed without significant overlapping. Once a cluster of nearby photographs are identified, a pin is defined to represent the cluster. See reference numeral 2160 in FIG. 3A. A pin definition 128 is a data structure that correlates a pin identifier (for example, "Pin A") with a plurality of photograph identifiers (for example, "Photograph 1", "Photograph 2", and "Photograph 3"). Pin definitions 128 established by map display module 164 are optionally stored in memory 120, as illustrated in FIG. 2.

In principle, each of the clustered photographs may be defined by a unique set of hierarchical place name tags. That is, even though the photographs were snapped nearby each other from the perspective of the displayed map, they still may have been snapped on different streets, or in different cities, states, or countries. Displaying all hierarchical place name tags for each clustered photograph would result in an overly cluttered map that would be difficult to understand. Instead, tag aggregation module 166 is configured to establish a consolidated pin label that provides an accurate, concise, and geographically meaningful characterization of the location where the clustered photographs were snapped. For example, in one embodiment consolidated pin label 16 is determined by first setting representative tags for each of the clustered photographs and then aggregating the representative tags.

The representative tag for a clustered photograph depends on the extent to which the clustered photographs share common hierarchical place name tags. Thus, in one embodiment a first determination is made with respect to whether all of the clustered photographs are tagged identically. See reference numeral 2210 in FIG. 3B. For example, photographs that were all snapped at the same house would share common hierarchical place name tags at every hierarchy level. In this case, the representative tags for each photograph are identical to the place name tags which are shared amongst all the clustered photographs. See reference numeral 2212 in FIG. 3B; this case is referred to herein as "Case I". Because the clustered photographs have identical hierarchical place name tags, they also have identical representative tags.

On the other hand, if the clustered photographs are not all tagged identically, a second determination is made with respect to whether at least one tag is shared amongst all of the clustered photographs. See reference numeral 2220 in FIG. 3B. For example, a cluster of three photographs, one snapped in Belgium, one snapped in The Netherlands, and one snapped in Luxembourg, have different hierarchical place name tags at the highest hierarchy level (country), and therefore will also be tagged differently at every lower hierarchy level. There is no tag shared amongst all of the clustered photographs. In this case, the representative tag for a photograph with a single place name tag is identical to that single place name tag. See reference numeral 2222 in FIG. 3B; this case is referred to herein as "Case II-A". For example, if one of the aforementioned three photographs has only one hierarchical place name tag "The Netherlands", then the representative tag for that photograph would be "The Netherlands". On the other hand, the representative tag for a photograph with multiple place name tags is identical to the second-highest level place name tag. See reference numeral 2224 in FIG. 3B; this case is referred to herein as "Case II-B". For example, if one of the aforementioned three photographs has hierarchical place name tags {Belgium, East Flanders, Ghent, Brabantdam}, then the representative tag for that photograph would be "East Flanders".

If neither Case I nor Case II-A nor Case II-B apply, then the clustered photographs are tagged differently at some but not all hierarchy levels. See reference numeral 2230 in FIG. 3B. The three photographs illustrated as being indexed in FIG. 3A are representative of this situation. Specifically, the three photographs are tagged identically at the two highest hierarchy levels PN1 and PN2, that is, all three photographs have the identical hierarchical place name tags {South Korea, Jeollabuk} at these levels. However, the three photographs are tagged differently at the two lowest hierarchy levels PN3 and PN4. In this case, the representative tag for any photograph having a shared place name tag at only the highest hierarchy level is identical to the second-highest level place name tag. See reference numeral 2232 in FIG. 3B; this case is referred to herein as "Case III-A". Otherwise, the representative tag for all other photographs is identical to those place name tags which are shared amongst the cluster of photographs. See reference numeral 2234 in FIG. 3B; this case is referred to herein as "Case III-B".

Once representative tags have been set for each of the clustered photographs, tag aggregation module 166 defines consolidated pin label 16 by aggregating the representative tags. See reference numeral 2310 in FIG. 3C. Thus, for example, if $\mathcal{R}_1, \mathcal{R}_2, \mathcal{R}_3, \ldots, \mathcal{R}_n$ represent the sets of representative tags for the first, second, third, . . . , nth clustered photographs, respectively, and $\mathcal{C}$ represents the tags defining consolidated pin label 16, then $$C = \bigcup_{i=1}^{n} \mathcal{R}_i.$$

The aforementioned three photographs illustrated as being indexed in FIG. 3A are not tagged identically, and thus Case I is inapplicable. Nor are they tagged differently at every hierarchy level, and thus Case II-A and Case II-B are inapplicable. Because these photographs share a common place name tag at intermediate hierarchy level PN2 ("Jeollabuk"), Case III-A is inapplicable. Therefore, pursuant to Case III-B, the representative tag for each of these photographs is identical to those place name tags which are shared amongst all three photographs: {South Korea, Jeollabuk}. As illustrated in pin definition 128 provided in FIG. 3C, a consolidated pin label representing these three photographs is "South Korea, Jeollabuk".

It is possible that the consolidated pin label may include a large quantity of hierarchical place name tags at an intermediate hierarchy level. This may occur, for example, where a photograph cluster contains photographs snapped in several different states within one country (Case II-B or Case III-A). Optionally, a determination is made with respect to whether consolidated pin label 16 has a quantity of tags at an intermediate hierarchy level that exceeds a defined limit or quantity. See reference numeral 2320 in FIG. 3C. For example, in one implementation the defined limit is three hierarchical place name tags. In an alternative implementation the defined limit is expressed in terms of a character limit that corresponds to a maximum amount of display space that should be consumed by consolidated pin label 16. Regardless, if it is determined that the defined limit is exceeded, the excess tags are removed and replaced, if appropriate, with a tag in a higher hierarchy level. See reference numeral 2322 in FIG. 3C. For instance, if the defined limit is three tags, then a consolidated pin label "Canada, Maine, New Hampshire, Vermont, New York" would be modified to "Canada, United States".

Once consolidated pin label 16 has been defined, thumbnail generator 168 generates a representative thumbnail for the clustered photographs. See reference numeral 2330 in FIG. 3C. In one embodiment, the photograph which serves as the basis for the representative thumbnail is centrally located with respect to the other clustered photographs. In another embodiment, the photograph which serves as the basis for the representative thumbnail was snapped at an earliest, median, or most recent time. Other criteria for selecting the photograph which serves as the basis for the representative thumbnail can be used in other embodiments.

Map display module 164 then displays thumbnail pin 12 and counter 14 on the map in the vicinity of the clustered photographs. See reference numeral 2340 in FIG. 3C. The counter indicates the number of individual photographs represented by a particular thumbnail pin. In some implementations consolidated pin label 16 is also displayed adjacent to thumbnail pin 12 and counter 14, even in the absence of any user input. Examples of such implementations are illustrated in FIGS. 1A and 1B. However, in other implementations, such as illustrated in FIG. 1C, in the absence of user input only unlabeled thumbnail pin 12' and counter 14 are displayed. In such implementations enlarged thumbnail pin 18 is displayed in response to user input, such as hovering a pointer over one of unlabeled thumbnail pins 12'. See reference numeral 2350 in FIG. 3C. Enlarged thumbnail pin 18 includes counter 14 and consolidated pin label 16. If consolidated pin label 16 does not fit into the allocated space in enlarged thumbnail pin 18 and is thus truncated, then further hovering user input can cause a tooltip displaying the complete consolidated pin label to appear. The user is optionally provided with the ability to edit the consolidated pin label to provide a more customized description.

Although method 2000 is described in the context of virtually pinning and labelling digital photographs on a digital map, it will be appreciated that the techniques disclosed herein can also be used to label other types of geotagged digital content that are pinned to a digital map. Examples of such alternative content types include social network postings and multimedia content. Furthermore, although the techniques disclosed herein describe how a particular cluster of photographs or other collection of digital content items can be labelled using geographic place names, it will be appreciated that, in general, an interactive map may contain several such clusters. In certain embodiments the techniques disclosed herein can therefore be applied recursively to label a plurality of such clusters. Likewise, as a user performs zooming operations on an interactive map, different geotagged digital content items will be "nearby" each other, as that term is used herein. Thus, in certain embodiments the techniques disclosed herein are applied in response to map zooming operations to provide a modified consolidated pin label for an updated clustering of digital content items.

Example Applications

FIGS. 4A and 4B comprise a table that lists several examples of how hierarchical place name tags for multiple photographs can be combined into a single consolidated pin label. These examples apply to photographs tagged with one or more hierarchical place name tags that correspond to the geographical hierarchy {country, state, city, street}. The examples are described in the context of method 2000. Each example consists of multiple photographs which are not tagged identically, and thus Case I does not apply to any of the examples.

a. Example A. At least one tag is shared amongst the photographs ("USA", "California", and "Los Angeles"), so neither Case II-A nor Case II-B applies. The photographs are tagged differently at some (one) but not all hierarchy levels. Neither of the photographs have a shared place name tag at only the highest hierarchy level, so Case III-A does not apply. Therefore, Case III-B applies. Each photograph is represented by the shared place name tags ("USA", "California", and "Los Angeles"). The consolidated pin label is "USA, California, Los Angeles".

b. Example B. At least one tag is shared amongst the photographs ("USA" and "California"), so neither Case II-A nor Case II-B applies. The photographs are tagged differently at some (two) but not all hierarchy levels. Neither of the photographs have a shared place name tag at only the highest hierarchy level, so Case III-A does not apply. Therefore, Case III-B applies. Each photograph is represented by the shared place name tags ("USA" and "California"). The consolidated pin label is "USA, California".

c. Example C. At least one tag is shared amongst the photographs ("USA"), so neither Case II-A nor Case II-B applies. The photographs are tagged differently at some (three) but not all hierarchy levels. The photographs have a shared place name tag at only the highest hierarchy level, so Case III-A applies. Each photograph is represented by the second-highest level place name tag (PN2). The consolidated pin label is "California, Arizona".

d. Example D. No tag is shared amongst the photographs. None of the photographs have a single place name tag. Case II-B applies to both photographs. Each photograph is represented by the second-highest place name tag (PN2). The consolidated pin label is "California, Sonora".

e. Example E. No tag is shared amongst the photographs. None of the photographs have a single place name tag. Case II-B applies to both photographs. Each photograph is represented by the second-highest place name tag (PN2). The consolidated pin label is "California, Sonora".

f. Example F. At least one tag is shared amongst the photographs ("USA" and "California"), so neither Case II-A nor Case II-B applies. The photographs are tagged differently at some (one) but not all hierarchy levels. Neither of the photographs have a shared place name tag at only the highest hierarchy level, so Case III-A does not apply. Therefore, Case III-B applies. Each photograph is represented by the shared place name tags ("USA" and "California"). The consolidated pin label is "USA, California".

g. Example G. At least one tag is shared amongst the photographs ("USA"), so neither Case II-A nor Case II-B applies. The photographs are tagged differently at some (two) but not all hierarchy levels. The photographs have a shared place name tag at only the highest hierarchy level, so Case III-A applies. Each photograph is represented by the second-highest level place name tag (PN2). The consolidated pin label is "California, Arizona".

h. Example H. At least one tag is shared amongst the photographs ("USA"), so neither Case II-A nor Case II-B applies. The photographs are tagged differently at some (one) but not all hierarchy levels. The photographs have a shared place name tag at only the highest hierarchy level, so Case III-A applies. Each photograph is represented by the second-highest level place name tag (PN2). The consolidated pin label is "California, Arizona".

i. Example I. No tag is shared amongst the photographs. None of the photographs have a single place name tag. Case II-B applies to both photographs. Each photograph is represented by the second-highest place name tag (PN2). The consolidated pin label is "California, Sonora".

j. Example J. No tag is shared amongst the photographs. Photograph 1 does not have a single place name tag, so Case II-B applies to Photograph 1, which is represented by the second-highest level place name tag ("California"). Photograph 2 has a single place name tag, so Case II-A applies to Photograph 2, which is represented by the single place name tag ("Mexico"). The consolidated pin label is "California, Mexico".

k. Example K. No tag is shared amongst the photographs. Both photographs have a single place name tag, so Case II-A applies to both photographs. Each photograph is represented by its single place name tag. The consolidated pin label is "USA, Mexico".

l. Example L. No tag is shared amongst the photographs. Photographs 1-12 do not have a single place name tag, so Case II-B applies to Photographs 1-12, each of which is represented by the second-highest level place name tag ("California", "Arizona", and "Sonora"). Photographs 13 and 14 each have a single place name tag, so Case II-A applies to Photographs 13 and 14, which are represented by their respective single place name tags ("USA" and "Mexico"). The consolidated pin label is "USA, Mexico, California, Arizona, Sonora".

Further Example Embodiments

Numerous variations and configurations will be apparent in light of this disclosure. For instance, as illustrated by FIG. 5, one example embodiment provides a non-transitory computer readable medium having instructions encoded thereon that, when executed by one or more processors, cause an aggregated geolocation tag labelling process 5000 to be carried out. In one example embodiment aggregated geolocation tag labelling process includes indexing a plurality of photographs, each photograph having associated therewith geotag data that defines a geographic location. See reference numeral 5100 in FIG. 5. See also reference numeral 2110 in FIG. 3A, which indicates that method 2000 for labelling aggregated geolocation tags includes accessing multiple photographs having associated geotag data.

Process 5000 further includes defining a plurality of hierarchical place name tags for each photograph, wherein the plurality of hierarchical place name tags for each photograph includes a highest level place name tag and at least one lower level place name tag. See reference numeral 5200 in FIG. 5. See also reference numeral 2120 in FIG. 3A, which indicates that method 2000 for labelling aggregated geolocation tags includes generating at least one hierarchical place name tag for each geotagged photograph.

Process 5000 further includes identifying a subset of the photographs having geographic locations that are nearby each other on the interactive digital map based on a specified zoom level of a displayed interactive digital map of a specified region. See reference numeral 5400 in FIG. 5. See also reference numeral 2150 in FIG. 3A, which indicates that method 2000 for labelling aggregated geolocation tags includes identifying a cluster of nearby photographs based on the geotag data.

Process 5000 further includes making a first determination that there is no common hierarchical place name tag amongst the photographs in the subset. See reference numeral 5500 in FIG. 5. See also reference numeral 2220 in FIG. 2B, which indicates that method 2000 for labelling aggregated geolocation tags includes determining whether at least one tag is shared amongst all of the clustered photographs.

Process 5000 further includes defining a consolidated pin label that includes a plurality of hierarchical place name tags for the consolidated pin label, wherein the plurality of hierarchical place name tags for the consolidated pin do not include any of the highest level place name tags. See reference numeral 5600 in FIG. 5. See also reference numerals 2224 and 2232 in FIG. 2B, which indicate that method 2000 for labelling aggregated geolocation tags includes (a) representing a photograph with multiple place name tags by the second-highest level place name tag, or (b) representing a photograph having a shared place name tag at only the highest hierarchy level by the second-highest level place name tag.

In some cases the plurality of hierarchical place name tags for each photograph includes a country tag and at least one lower level place name tag selected from a group consisting of a state tag, a city tag, and a street tag. In some cases the aggregated geolocation tag labelling process further comprises (a) making a second determination that the consolidated pin label contains more than a defined quantity of hierarchical place name tags; and (b) in response to making the second determination, modifying the consolidated pin label by replacing a plurality of lower level place name tags with at least one highest level place name tag. In some cases the aggregated geolocation tag labelling process further comprises making a second determination that each of the photographs in the subset is associated with multiple hierarchical place name tags. In some cases the specified zoom level is defined by user input. In some cases identifying the subset of photographs further comprises comparing (a) a distance, on the displayed interactive map, between the geographic locations corresponding to two of the photographs with (b) a defined minimum separation threshold. In some cases defining the plurality of hierarchical place name tags for each photograph further comprises accessing a geocoding application programming interface via a network. In some cases the geotag data comprises a latitude/longitude pair. In some cases indexing the plurality of photographs further comprises generating a data structure that includes a photograph identifier and a latitude/longitude pair for each of the plurality of photographs. In some cases (a) indexing the plurality of photographs further comprises generating a data structure that includes a photograph identifier and a latitude/longitude pair for each of the plurality of photographs; and (b) defining the plurality of hierarchical place name tags for each photograph further comprises recording the plurality of hierarchical place name tags for each photograph in the data structure.

Another example embodiment provides a digital mapping system. The digital mapping system comprises a memory resource having stored thereon a data structure in which a plurality of photographs are indexed. Each photograph is associated with geotag data that defines a geographic location. The system further comprises a place name tag generator configured to define a plurality of hierarchical place name tags for each of the photographs. The plurality of hierarchical place name tags for each photograph includes a highest level place name tag and at least one lower level place name tag. The system further comprises a map display module configured to generate an interactive digital map that depicts a geographical region at a user-defined zoom level. The map display module is further configured to identify a clustered subset of the photographs that are nearby each other on the interactive digital map based on the user-defined zoom level. The system further comprises a tag aggregation module configured to define a consolidated pin label that includes some, but not all, of the hierarchical place name tags defined for the photographs in the clustered subset. In some cases the memory resource also has stored thereon a pin definition data structure that correlates a pin identifier with the consolidated pin label and identifiers for each of the photographs in the clustered subset. In some cases (a) the tag aggregation module is further configured to define a modified consolidated pin label that is different than the consolidated pin label, and that also includes some, but not all, of the hierarchical place name tags defined for the photographs in the clustered subset; and (b) the modified consolidated pin label is defined in response to user input that adjusts the user-defined zoom level. In some cases the system further comprises a thumbnail generator configured to generate a thumbnail image that is representative of one of the photographs in the clustered subset. In some cases the plurality of hierarchical place name tags for each photograph includes a country tag, an intermediate level place name tag, and a street tag. In some cases the place name tag generator is configured to define the plurality of hierarchical place name tags by (a) sending geotag data to a geocoding application programming interface via a network; (b) receiving, via the network, the plurality of hierarchical place name tags; and (c) storing the plurality of hierarchical place name tags in the data structure stored in the memory resource.

Another example embodiment provides an aggregated geolocation tag labelling method. The method comprises indexing a plurality of digital content items. Each digital content item is associated with geotag data that defines a geographic location. The method further comprises defining, for each digital content item, a plurality of hierarchical place name tags that includes a highest level place name tag and a second-highest level place name tag. The method further comprises identifying a subset of clustered digital content items having geographic locations that are nearby each other on an interactive digital map that displays a specified region at a user-specified zoom level. The process further comprises identifying at least one common hierarchical place name tag shared amongst each of the clustered digital content items. The method further comprises defining a consolidated pin label that includes at least one consolidated hierarchical place name tag. If the clustered digital content items share only one common hierarchical place name tag, each clustered digital content item is represented in the consolidated pin label by its second-highest level place name tag. If the clustered digital content items share common hierarchical place name tags at multiple hierarchy levels, the clustered digital content items are represented in the consolidated pin label by the common hierarchical place name tags. In some cases the method further comprises identifying a highest hierarchy level associated with the at least one common hierarchical place name tag shared amongst each of the clustered digital content items. In some cases each of the digital content items are selected from a group consisting of a digital photograph, a social networking post, and an audiovisual recording. In some cases the second-highest level place name tag for each digital content item is selected from a group consisting of a regional tag, a city tag, and a street tag.

The foregoing disclosure has been presented for the purposes of illustration and description. It is not intended to be exhaustive or to be limited to the particular described embodiments. Many modifications and variations are possible. It is therefore intended that the scope of the invention be limited not by this detailed description, but rather by the claims appended hereto.

What is claimed is:

1. A non-transitory computer readable medium having instructions encoded thereon that, when executed by one or more processors, cause an aggregated geolocation tag labelling process to be carried out, the process comprising:
    indexing a plurality of photographs, each photograph having associated therewith geotag data that defines a geographic location;
    defining a plurality of hierarchical place name tags for each photograph, wherein the plurality of hierarchical place name tags for each photograph includes a highest level place name tag and at least one lower level place name tag;
    identifying a subset of the photographs having geographic locations that are nearby each other on an interactive digital map of a specified region based on a specified zoom level of the interactive digital map;
    making a first determination that there is no common hierarchical place name tag amongst the photographs in the subset, wherein the first determination is made by comparing the hierarchical place name tags for the photographs in the subset; and
    defining a consolidated pin label that includes a plurality of hierarchical place name tags for the consolidated pin label, wherein the plurality of hierarchical place name tags for the consolidated pin do not include any of the highest level place name tags.

2. The non-transitory computer readable medium of claim 1, wherein the plurality of hierarchical place name tags for each photograph includes a country tag and wherein the at least one lower level place name tag for each photograph is selected from a group consisting of a state tag, a city tag, and a street tag.

3. The non-transitory computer readable medium of claim 1, wherein the aggregated geolocation tag labelling process further comprises:
    making a second determination that the consolidated pin label contains more than a defined quantity of hierarchical place name tags; and
    in response to making the second determination, modifying the consolidated pin label by replacing a plurality of the lower level place name tags with at least one of the highest level place name tags.

4. The non-transitory computer readable medium of claim 1, wherein the aggregated geolocation tag labelling process further comprises making a second determination that each of the photographs in the subset is associated with multiple hierarchical place name tags.

5. The non-transitory computer readable medium of claim 1, wherein the specified zoom level is defined by user input.

6. The non-transitory computer readable medium of claim 1, wherein identifying the subset of photographs further comprises comparing (a) a distance, on the displayed interactive map, between the geographic locations corresponding to two of the photographs with (b) a defined minimum separation threshold.

7. The non-transitory computer readable medium of claim 1, wherein defining the plurality of hierarchical place name tags for each photograph further comprises accessing a geocoding application programming interface via a network.

8. The non-transitory computer readable medium of claim 1, wherein the geotag data comprises a latitude/longitude pair.

9. The non-transitory computer readable medium of claim 1, wherein indexing the plurality of photographs further comprises generating a data structure that includes a photograph identifier and a latitude/longitude pair for each of the plurality of photographs.

10. The non-transitory computer readable medium of claim 1, wherein:
   indexing the plurality of photographs further comprises generating a data structure that includes a photograph identifier and a latitude/longitude pair for each of the plurality of photographs; and
   defining the plurality of hierarchical place name tags for each photograph further comprises recording the plurality of hierarchical place name tags for each photograph in the data structure.

11. A digital mapping system comprising:
   a memory resource having stored thereon a data structure in which a plurality of photographs are indexed, each photograph having associated therewith geotag data that defines a geographic location;
   a place name tag generator configured to define a plurality of hierarchical place name tags for each of the photographs, wherein the plurality of hierarchical place name tags for each photograph includes a highest level place name tag and at least one lower level place name tag;
   a map display module configured to (a) generate an interactive digital map that depicts a geographical region at a zoom level and (b) identify a clustered subset of the photographs that are nearby each other on the interactive digital map based on the zoom level; and
   a tag aggregation module configured to define a consolidated pin label that includes two or more, but not all, of the hierarchical place name tags defined for the photographs in the clustered subset.

12. The digital mapping system of claim 11, wherein the memory resource also has stored thereon a pin definition data structure that correlates a pin identifier with the consolidated pin label and identifiers for each of the photographs in the clustered subset.

13. The digital mapping system of claim 11, wherein:
   the tag aggregation module is further configured to define a modified consolidated pin label that is different than the consolidated pin label, and that also includes two or more, but not all, of the hierarchical place name tags defined for the photographs in the clustered subset; and
   the modified consolidated pin label is defined in response to user input that adjusts the zoom level.

14. The digital mapping system of claim 11, further comprising a thumbnail generator configured to generate a thumbnail image that is representative of one of the photographs in the clustered subset.

15. The digital mapping system of claim 11, wherein the plurality of hierarchical place name tags for each photograph includes a country tag, an intermediate level place name tag, and a street tag.

16. The digital mapping system of claim 11, wherein the place name tag generator is configured to define the plurality of hierarchical place name tags by:
   sending geotag data to a geocoding application programming interface via a network;
   receiving, via the network, the plurality of hierarchical place name tags; and
   storing the plurality of hierarchical place name tags in the data structure stored in the memory resource.

17. An aggregated geolocation tag labeling method comprising:
   indexing a plurality of digital content items, each digital content item having associated therewith geotag data that defines a geographic location;
   defining, for each digital content item, a plurality of hierarchical place name tags that includes a highest level place name tag and a second-highest level place name tag;
   identifying a subset of clustered digital content items having geographic locations that are nearby each other on an interactive digital map that displays a specified region at a user-specified zoom level;
   identifying at least one common hierarchical place name tag shared amongst each of the clustered digital content items; and
   defining a consolidated pin label that includes at least one consolidated hierarchical place name tag, wherein:
      if the clustered digital content items share only one common hierarchical place name tag, each clustered digital content item is represented in the consolidated pin label by its second-highest level place name tag, and
      if the clustered digital content items share common hierarchical place name tags at multiple hierarchy levels, the clustered digital content items are represented in the consolidated pin label by the common hierarchical place name tags.

18. The aggregated geolocation tag labelling method of claim 17, further comprising identifying a highest hierarchy level associated with the at least one common hierarchical place name tag shared amongst each of the clustered digital content items.

19. The aggregated geolocation tag labelling method of claim 17, wherein each of the digital content items are selected from a group consisting of a digital photograph, a social networking post, and an audiovisual recording.

20. The aggregated geolocation tag labelling method of claim 17, wherein the second-highest level place name tag for each digital content item is selected from a group consisting of a regional tag, a city tag, and a street tag.

* * * * *